United States Patent
Jain et al.

(10) Patent No.: US 6,442,697 B1
(45) Date of Patent: Aug. 27, 2002

(54) METHOD AND APPARATUS TO CONTROL PROCESSOR POWER AND PERFORMANCE FOR SINGLE PHASE LOCK LOOP (PLL) PROCESSOR SYSTEMS

(75) Inventors: Satchit Jain, San Jose; Sun-Soo Cho, Sunnyvale, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/534,187

(22) Filed: Mar. 24, 2000

(51) Int. Cl.[7] .............................. G06F 1/32; G06F 1/08; G06F 1/10; G06T 1/60; G05F 1/10
(52) U.S. Cl. .................. 713/300; 713/320; 713/321; 713/322; 713/323
(58) Field of Search ...................... 713/300, 310, 713/320, 321, 322, 323, 324, 501, 600; 709/224, 250; 711/100; 345/418, 700; 375/376; 455/260, 343; 348/571

(56) References Cited

U.S. PATENT DOCUMENTS

| 4,847,870 A | * | 7/1989 | Butcher |
| 5,598,447 A | * | 1/1997 | Usui |
| 6,125,217 A | * | 9/2000 | Paniccia et al. |
| 6,240,152 B1 | * | 5/2001 | Ho |

* cited by examiner

Primary Examiner—Gopal C. Ray
(74) Attorney, Agent, or Firm—Blakely, Sokoloff, Taylor & Zafman LLP

(57) ABSTRACT

An integrated circuit contains a central processing unit ("CPU"), a graphic control hub ("GCH"), a memory control hub ("MCH"), and a phase lock loop ("PLL"). The GCH, MCH, and PLL are coupled to the CPU. The MCH controls memory transactions. The PLL is configured to allow the CPU to operate at more than one power consumption states.

24 Claims, 8 Drawing Sheets

200

METHOD AND APPARATUS TO CONTROL PROCESSOR POWER AND PERFORMANCE FOR SINGLE PHASE LOCK LOOP (PLL) PROCESSOR SYSTEMS

BACKGROUND OF THE INVENTION

1. Field of the Invention

The present invention relates generally to the field of computer systems. More specifically, the present invention relates to the conservation of power consumption in a computer system.

2. Description of the Related Art

As more systems become portable, increased reliance will necessarily be placed on portable power supplies, particularly batteries. Reducing power consumption by processors becomes increasingly important as the industry moves to maximize battery life. Even in stationary systems, excessive power consumption translates into higher operational costs. Additionally, increasingly stringent governmental requirements and environmental standards militate toward reducing the power consumed in a computer system where possible.

A typical high performance system consumes a large amount of power because the system generally uses high-speed microprocessors and co-processors. System reliability and battery life are problematic for a system that consumes excessive power. For example, a typical high frequency microprocessor may increase temperature rapidly when the microprocessor consumes full power and operates at peak performance.

However, many applications, such as word processing, do not require the microprocessor to operate at full power because a typical high performance microprocessor can support more than a typical word processor. Accordingly, it is not necessary to keep a high performance system operating at full power at all times because running at full power not only reduces the battery life, but also affects overall system reliability.

Therefore, it is wasteful to keep a system running at full power at all times.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
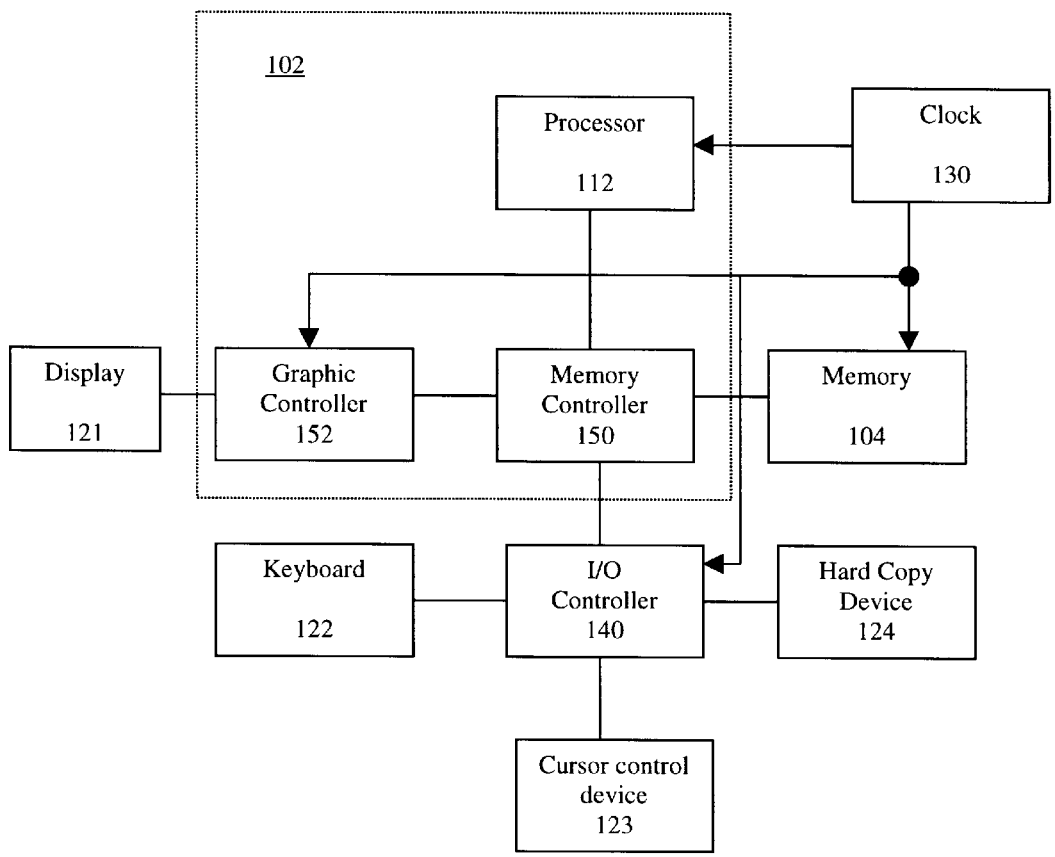
FIG. 1 illustrates one embodiment of a single PLL based CPU system.

A method and an apparatus for conserving system power consumption are described.

In the following description, numerous specific details are set forth for purposes of explanation, in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. Principally for reasons of common usage, it has proven convenient at times to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise in the following discussions, it is appreciated that throughout the present invention, discussions utilizing terms such as "processing" or "computing" or "calculating" or "determining" or "displaying" or the like, refer to the action and processes of a computer system or similar electronic computing device that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

OVERVIEW

A mechanism for conserving system power consumption using multiple power consumption states is disclosed. In one embodiment, the system dynamically transits between a high power consumption state and a low power consumption state, which is also known as Geyserville transition, according to computing power required by the applications. For example, the central processing unit ("CPU") transits from a high power consumption state to a low power consumption state when the CPU only needs to support a simple application, such as, for example, a word processor.

In an alternative embodiment, a single phase lock loop ("PLL") is used to generate various clock signals, which are used by a CPU, a graphic control hub ("GCH"), and a memory control hub ("MCH"). In this embodiment, the PLL, CPU, GCH, and MCH are integrated in an integrated circuit ("IC"). In another embodiment, the CPU is configured to operate more than one clock frequencies. In an alternative embodiment, the CPU can operate at more than one voltage levels.

FIG. 1 illustrates one embodiment of a single PLL based CPU system 100. Computer system 100 includes a processor 112, a clock 130, a memory 104, a memory controller 150, a graphic controller 152, and an input and output ("I/O") controller 140. Graphic controller 152 is coupled to a display 121. I/O controller 140 is coupled to a keyboard 122, a hard copy device 124, and a cursor control device 123.

Processor 112 includes, but is not limited to, a microprocessor such as an Intel Architecture Microprocessor, manufactured by Intel Corporation of Santa Clara, Calif., the corporate assignee of the present invention. Processor 112 may also be another processor such as the PowerPC™, Alpha™, etc.

In one embodiment, memory controller 150 controls memory 104 and memory 104 may be a random access memory (RAM) or other dynamic storage device for storing information and instructions. Memory 104 also may be used for storing temporary variables or other intermediate information during execution of instructions by processor 112. Computer system 100 may also comprise a read only memory (ROM) and/or other static storage device for storing static information and instructions for processor 112.

Graphic controller 152 controls display 121, such as cathode ray tube (CRT) or liquid crystal display (LCD), for displaying information to a computer user. In one embodiment, I/O controller 140 is coupled to processor 112 via memory controller 150. I/O controller 140 controls input and output devices such as keyboard 122, cursor control device 123, and hard copy device 124. Cursor control 123 may be a mouse, trackball, trackpad, stylus, or cursor direction keys for communicating direction information and command selections to processor 112, and for controlling cursor movement on display 121.

Hard copy device 124 may be used for printing instructions, data, or other information on a medium such as paper, film, or similar types of media. Furthermore, a sound recording and playback device such as a speaker and/or microphone may optionally be coupled to I/O controller 140 for audio interfacing with computer system 100. Clock 130 is used to provide various clock signals to different components, such as processor 112, memory controller 150, etc.

In one embodiment, processor 112, graphic controller 152, and memory controller 150 may be integrated onto a single chip. In another embodiment, processor 112, graphic controller 152, I/O controller 140, and memory controller 150 may be integrated onto a single chip. Note that any or all of the components of system 100 and associated hardware may be used in the present invention. However, it can be appreciated that other configurations of the computer system may include some or all of the devices.

Figure 2:
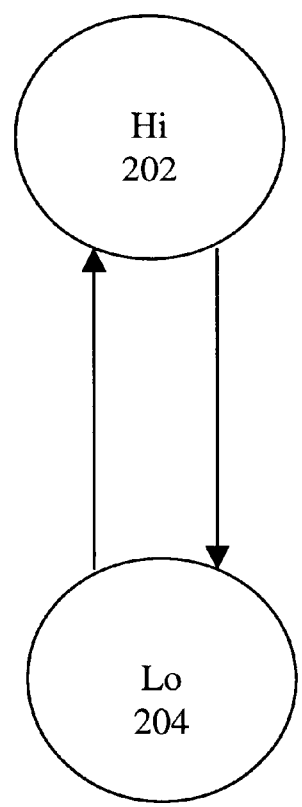
FIG. 2 is a state diagram illustrating one embodiment of power consumption states.

FIG. 2 is a state diagram 200 illustrating one embodiment of power consumption states. State diagram 200 contains a high power state 202 and a low power state 204. High power state 202 indicates high clock frequency and high operating voltage while low power state 204 indicates low clock frequency and low operating voltage. For example, high power state 202 may operate at 700 megahertz (MHz) with operating voltage at 1.8 volt (v) while low power state 204 operates at 400 MHz with operating voltage at 1.3v. To conserve power consumption, a system or a CPU may, in one embodiment, transit dynamically between high power state 202 and lower power state 204 according to the computing power required by the applications.

In another embodiment, a system dynamically switches between high power state 202 and low power state 204 without user intervention. For example, multiple transitions between high power state 202 and low power state 204 may take place between keystrokes. During high power state 202, in one embodiment the CPU consumes full power and is able to perform full functions. However, during low power state 204, in one embodiment the CPU consumes lower power and is only able to perform some functions. Note that high power state 202 may consume double or triple the amount of power than low power state 204.

Power consumption can be calculated in terms of voltage and frequency. The mathematic equation for the power consumption is listed as follows.

$$P\ CV^2 f$$

Where P represents power and C represents a constant. Also, V represents voltage while f represents frequency. For example, if high power state 202 operates at 700 MHz with 1.8v, the power consumption for high power state $P_H$ would be $$P_H\ CV^2 f = C \times (1.8)2 \times 700 = 2268C$$

If low power state 204 operates at 400 MHz with 1.3v, the power consumption for low power state $P_L$ would be $$P_L\ CV^2 f = C \times (1.3)2 \times 400 = 676C$$

Thus, $P_H$ consumes mores than three times the power that $P_L$ consumes.

Figure 3:
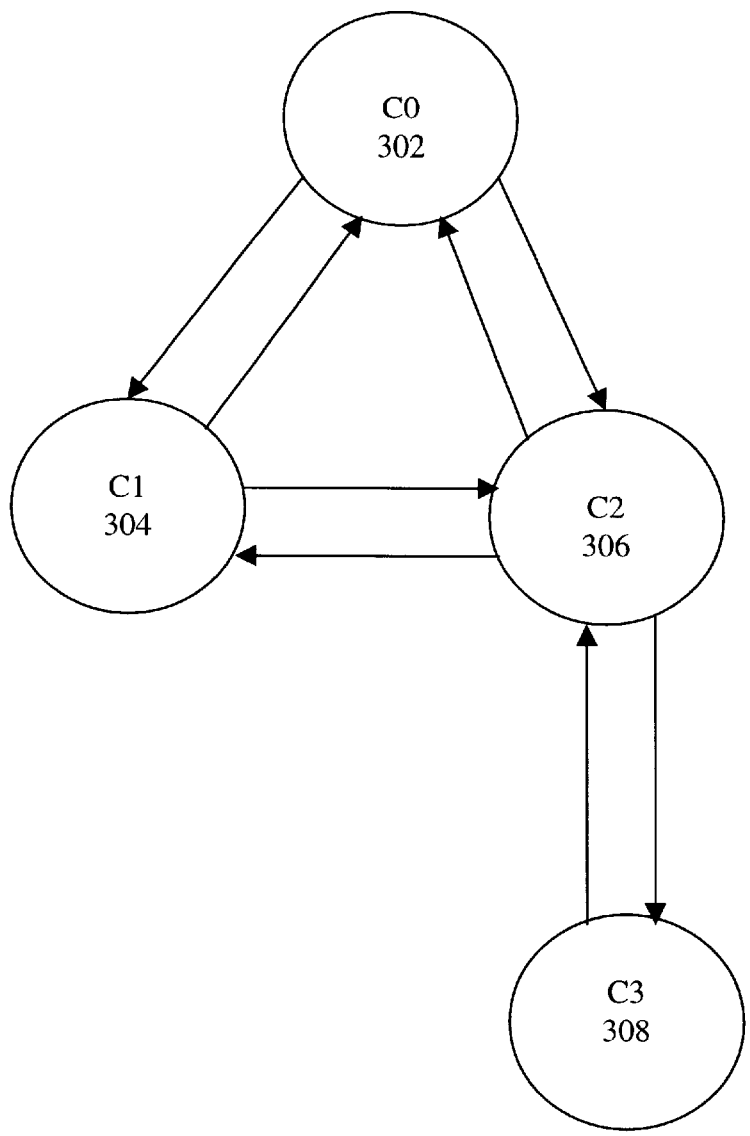
FIG. 3 is a state diagram illustrating one embodiment of power consumption states having four states.

FIG. 3 is a state diagram 300 illustrating one embodiment of power consumption states having four states. State diagram 300 contains C0 302, C1 304, C2 306, and C3 308 states. Additional states may be added but they are not important to understanding the present invention.

In one embodiment, C0 302 state is an active power consumption state where a CPU performs full range of functions and consumes full power.

During C0 302 state, power management for conserving power is not employed. C1 304 state is, in one embodiment, an auto-halt power consumption state where the advanced-power management ("APM") for conserving power may be performed. A CPU running at C1 304 state commonly consumes less power than the CPU running at C0 302 state. For example, during C1 304 state instructions are commonly not executed and the instruction cache is commonly empty.

In one embodiment, C2 306 state is a stop-grant power consumption state where less power is consumed in C2 306 state than in either C0 302 state or C1 304 state. For example, during C2 306 state the clock signals for the CPU may be stopped. In another embodiment, the CPU is partially shut down. For example, the main portion of the CPU is shut down while the snoop portion of the CPU is still active for monitoring the front site bus. To enter C2 306 state, the CUP can either be at C1 304 state or C0 302 state. Likewise, C2 306 state can move directly to C0 302 state without entering C1 304 state first.

In one embodiment, C3 308 state is known as deep sleep state where some components of a system, including the CPU, are shut down. In this embodiment, the CPU is completely shut down so that the clock frequency can be changed at C3 308 state. To enter C3 308 state, the CPU is, in one embodiment, configured to enter C2 306 state before entering C3 308 state.

In an alternative embodiment, the CPU can switch directly from C0 302 state to C3 308 state.

Figure 4:
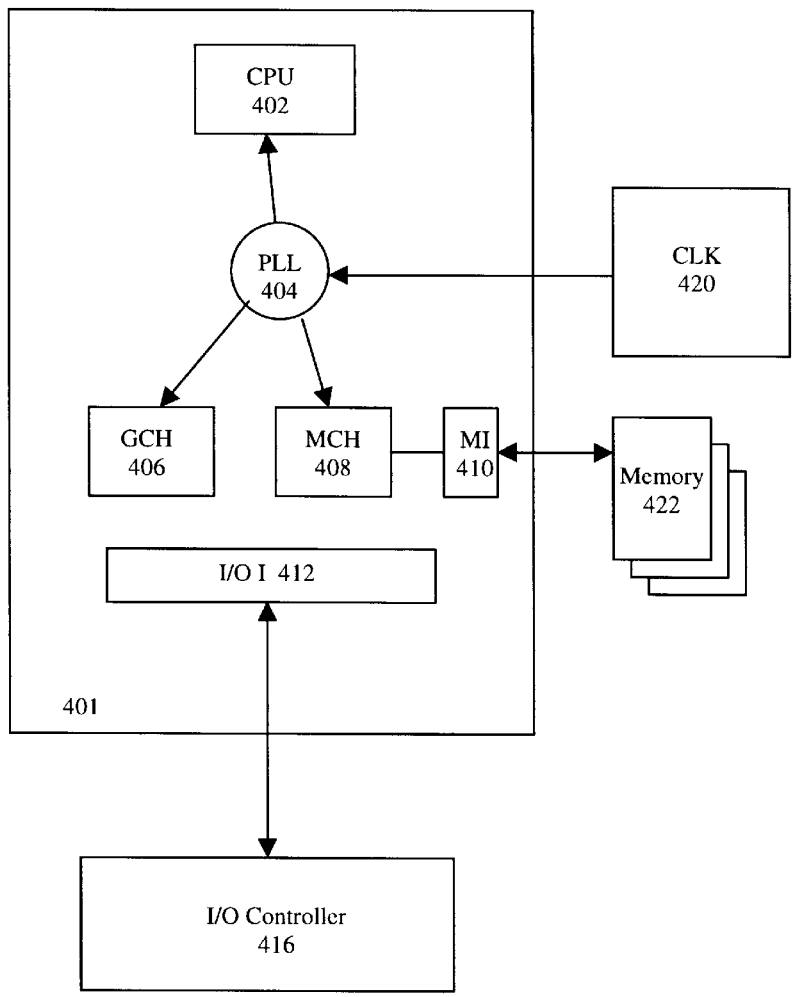
FIG. 4 is block diagram illustrating a system that is able to enter different power consumption states.

FIG. 4 is a block diagram 400 illustrating a system that is able to enter different power consumption states. Block diagram 400 includes a clock device 420, a processing unit ("PU") 401, memory devices 422, and an input and output control hub ("ICH") 416. PU 401 further includes a CPU 402, a PLL 404, a graphic control hub ("GCH") 406, a memory control hub ("MCH") 408, a memory interface ("MI") 410, and an input/output ("I/O") interface 412. Other blocks or devices may be added in block diagram 400 but they are not pertinent to understanding the present invention.

In one embodiment, Clock device 420 provides clock signals to various devices including PU 401. In another embodiment, clock device 420 provides multiple clock frequencies to facilitate multiple power consumption states. For example, clock device 420 provides 700 MHz clock signal to PU 401 during high power consumption state while clock device 420 provides 400 MHz clock signal to PU 401 during low power consumption state. In yet another embodiment, clock device 420 supplies clock signals to memory 422.

In one embodiment, Memory 422 contains multiple high-performance memory banks. In one embodiment, high-performance DRAMs (Direct Random Access Memory), such as, for example, Rambus™ DRAM ("RDRAM") may be used for memory 422. In an alternative embodiment, high-speed SRAM (Static Random Access Memory) may be used for memory 422.

In one embodiment, ICH 416 controls data transaction between PU 401 and external devices, such as, for example, the main memory, system bus, and various input devices. In this embodiment, ICH 416 does not transit between power consumption states. I/O interface 412 is used to communicate between PU 401 and ICH 416. In one embodiment, I/O interface 412 contains its own PLL device so that when PLL 404 stops providing clock signals I/O interface 412 can still be alive for monitoring the traffic between PU 401 and ICH 416.

PLL 404 receives clock signals from clock device 420 and redistributes clock signals to various components including CPU 402, GCH 406, and MCH 408. During C3 state, in one embodiment the clock signal from PLL 404 to CPU 402 may be stopped for conserving power. When the clock signal stops, CPU 402 stops execution, which normally conserves power consumption. Once CPU 402 stops execution, in one embodiment the execution can be resumed by new clock signals. In one embodiment, the new clock signal from PLL 404 may have a different clock frequency, such as a slower clock frequency, for conserving power consumption. In another embodiment, at C3 state, CPU 402 may be powered down by PLL 404 and subsequently powered up with a different voltage level.

In one embodiment, GCH 406 receives clock signals from PLL 404 and controls graphic implementations. In one embodiment, MCH 408 also receives clock signals from PLL 404 and it controls memory access via MI 410. In one embodiment, MI 410 is tailored to specific memories used in memory 422. For example, if RDRAM is used in memory 422, MI 410 may be a Rambus™ ASIC cell ("RAC"), which is used to communicate between PU 401 and RDRAM. PU 401 is, in one embodiment, integrated into a single integrated circuit ("IC") for conserving power consumption.

In one operation, PLL 404 is, in one embodiment, powered down during C3 state. Once PLL 404 is powered down, PLL 404 suspends clock distribution in PU 401. After the clock signals from PLL 404 are suspended, various components, such as, for example, CPU 402, GCH 406 and MCH 408, are shut down. Once CPU 402 is suspended, CPU 402 can be subsequently resumed with a lower clock frequency, which may require less power to operate.

Figure 5:
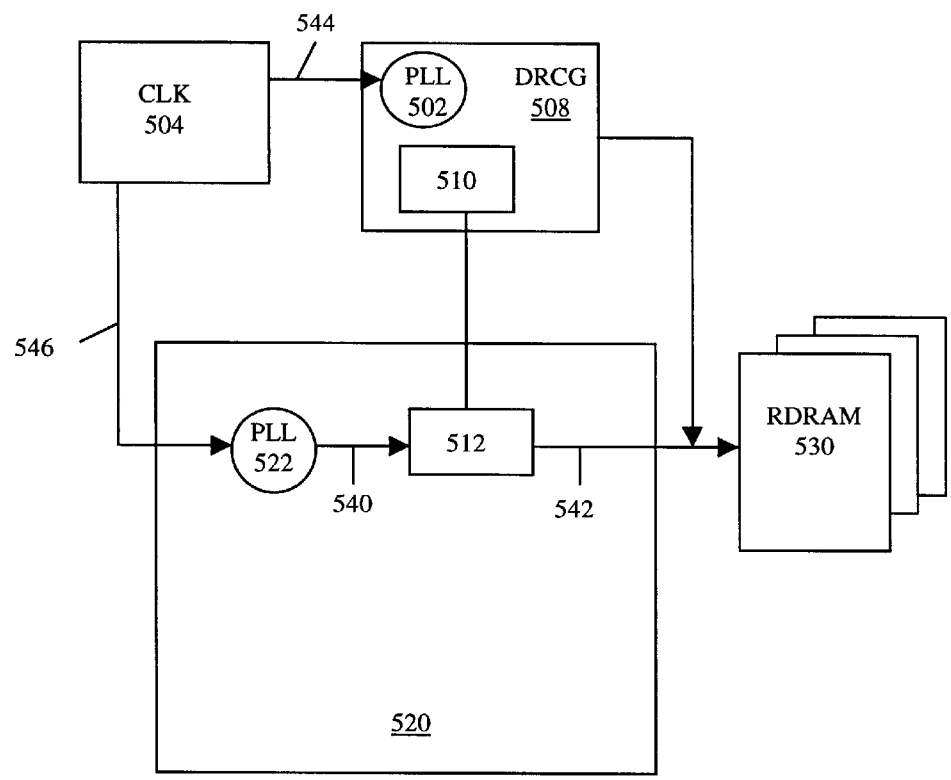
FIG. 5 is a block diagram illustrating one embodiment of a system clock.

FIG. 5 is a block diagram 500 illustrating one embodiment of a clock configuration. In one embodiment, block diagram 500 contains a clock generator 504, a Direct Rambus™ Clock Generator ("DRCG") 508, RDRAM 530, and a clock distributor 520. DRCG 508 further contains a PLL 502 and a phase aligner 510. Clock distributor 520 also contains a PLL 522 and a phase aligner 512. Other blocks may be added to block diagram 500, but they are not important to understanding the invention.

In one embodiment, clock generator 504 sends clock signals to PLL 502 and PLL 522 via clock bus 544, 546, respectively. In one embodiment, PLL 502 is used to distribute clock signals to DRCG 508 where DRCG 508 further distributes clock signals to RDRAM 530. In order to regulate the clock signals between DRCG 508 and clock distributor 520, phase aligners 510 and 512 are used to synchronize the clock signals.

In one operation, during C3 state, the reference clock, which is carried by clock bus 544, from clock generator 504 to DRCG 508 is active, in one embodiment. However, phase aligner 512 is suspended so that the clock distributor 520 stops distributing clock signals. In one embodiment, when the clock generator suspends clock distribution to RDRAM 530, RDRAM 530 still receives clock signals from DRCG 508, which is used for memory refresh. After frequency and voltage transition, phase aligner 510 and 512 are resumed and a new power consumption state may be entered.

Figure 6:
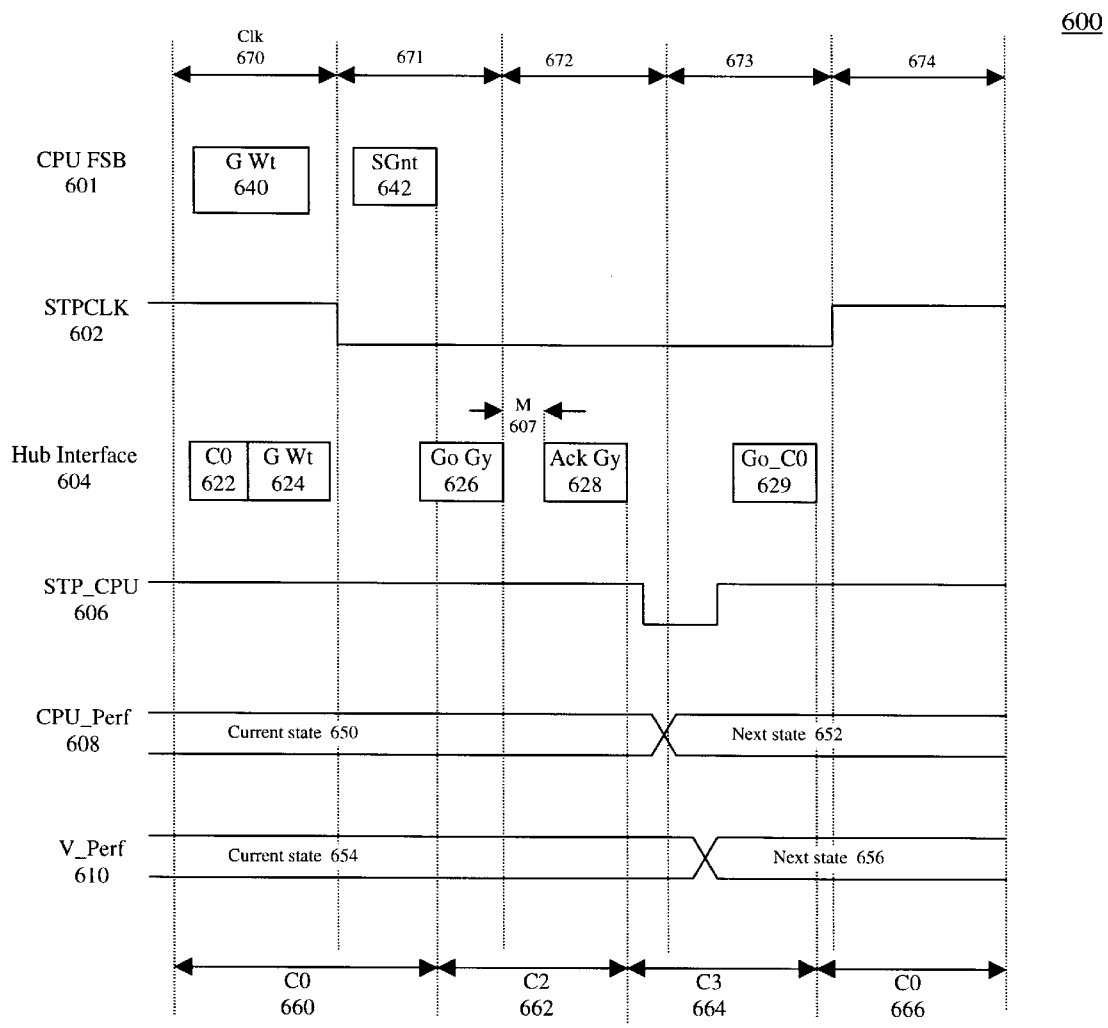
FIG. 6 is a timing diagram illustrating a process for switching between power consumption states.

FIG. 6 is a timing diagram 600 illustrating a process for switching between power consumption states, such as Geyserville transition. Geyserville transition is a power consumption transition that switches from a high power consumption state or C0 state to a low power consumption state or C3 state.

In one embodiment, CPU writes a Geyserville transition request, also known as Geyserville write ("GWt"), to the Geyserville control register, to initiate a Geyserville transition. When CPU issues GWt 640 on the CPU front side bus ("FSB") 601 at clock cycle 670, FSB snoop is locked. GWt 640 then is forwarded to hub interface 604 in which MCH receives GWt 624. Next, GWt 624 is further forwarded to ICH where a Geyserville transition sequence is introduced. When the stop CPU clock signal is activated on CPU FSB 601 at clock cycle 671, a goto-Geyserville ("Go_Gy") signal 626 is issued on hub interface 604.

Once Go_Gy signal 626 is active, the transition from C0 state 660 to C2 state 662 takes place. At clock cycle 672, a maintenance procedure 607 is performed. In one embodiment, maintenance procedure 607 performs temperature and current calibration, memory refresh, and current calibration. After execution of maintenance procedure 607, a command of acknowledged Geyserville ("Ack_Gy") 628 is initiated on hub interface 604.

After Ack_Gy 628 is issued on hub interface 604, MCH sends permission to perform Geyserville transition. At clock cycle 673, the output of the phase detector or aligner is stopped. In one embodiment, the DRCG feedback path is kept alive. Next, the frequency and voltage transitions takes place before the end of clock cycle 673. After the voltage transition, which may take longer than frequency transition, bus ratio is changed and then, FSB Snoop is resumed. At clock cycle 674, the devices transit into nap state from the power down state.

Figure 7:
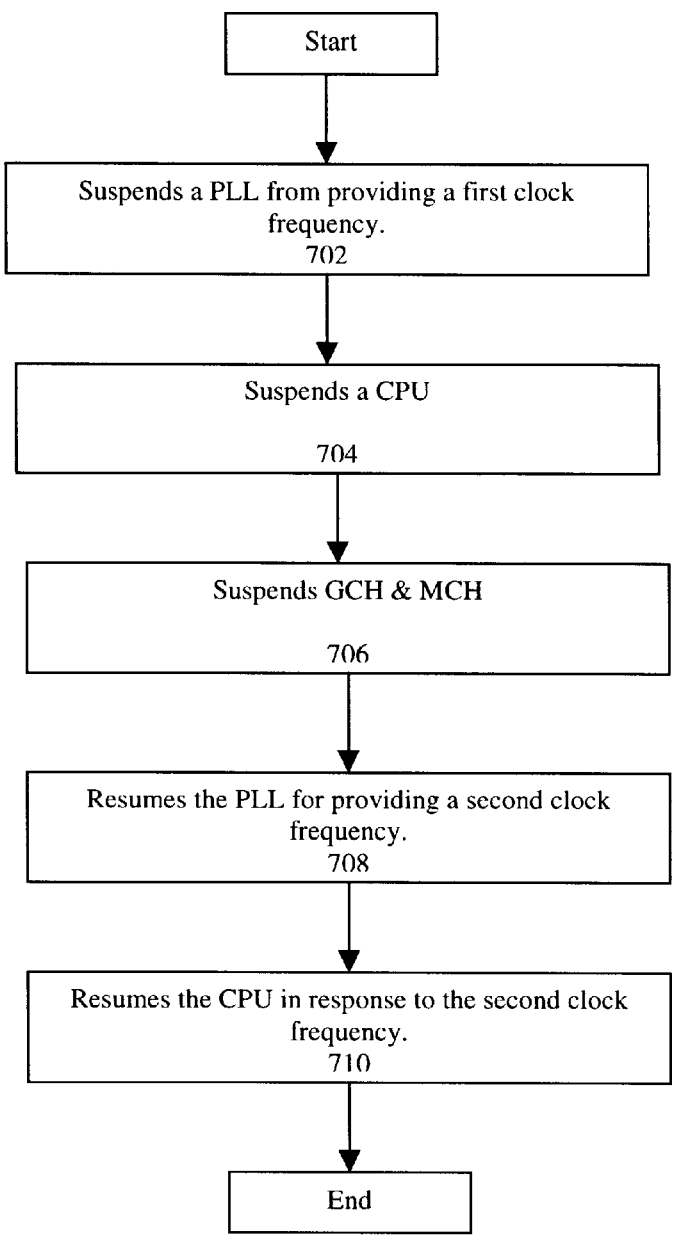
FIG. 7 is a flowchart illustrating a process of switching power consumption states.

FIG. 7 is a flowchart 700 illustrating a process of switching power consumption levels. A process begins at the start block and proceeds to block 702. At block 702, the process suspends the PLL from providing a first clock frequency. After block 702, the process proceeds to block 704. At block 704, the process suspends the CPU. After block 704, the process proceeds to block 706 where the process suspends the GCH. After block 706, the process proceeds to block 708. At block 708, the process resumes the PLL with a second clock frequency. After block 708, the process proceeds to block 710 where the process resumes the CPU in response to the second clock frequency. After block 710, the process ends at end block.

Figure 8:
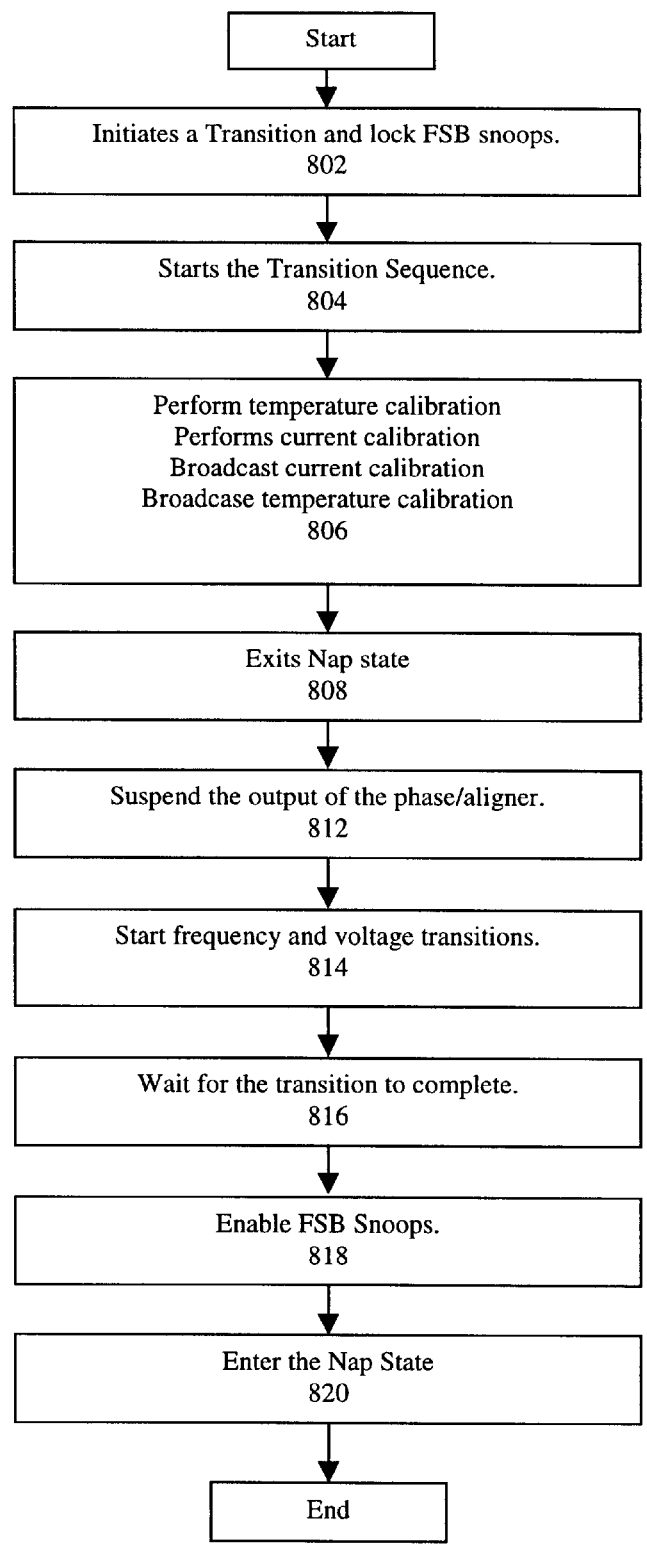
FIG. 8 is a flowchart illustrating a process of entering a low power consumption state from a high power consumption state.

FIG. 8 is a flowchart 800 illustrating a process of entering a low power consumption level from a high power consumption level. A process begins at start block and proceeds to block 802. At block 802, the process initiates a transition and locks FSB snoops. After block 802, the process moves to block 804 where the process starts the transition sequence. After block 804, the process proceeds to block 806. At block 806, the process performs temperature and current calibrations, memory refresh, and calibration broadcast. After block 806, the process proceeds to block 808 where the process exits nap state or C2 state. After block 808, the process proceeds to block 812. At block 812, the process suspends the output of the phase aligner. After block 812, the process proceeds to block 814, where the process starts frequency and voltage transitions. After block 814, the process proceeds to block 816. At block 816, the process waits for the transition to complete. After block 816, the process proceeds to block 818, where the process enables FSB snoops. After block 818, the process proceeds to block 820 where the process enters the nap state or C2 state. After block 820, the process ends.

In the foregoing detailed description, the method and apparatus of the present invention have been described with reference to specific exemplary embodiments thereof. However, it will be evident that various modifications and changes may be made thereto without departing from the broader spirit and scope of the present invention. The present specification and figures are accordingly to be regarded as illustrative rather than restrictive.

Thus, a method and a system for conserving power consumption have been described.

We claim:

1. An integrated circuit comprising:
   a central processing unit ("CPU");
   a graphic control hub ("GCH") coupled to said CPU;
   a memory control hub ("MCH") coupled to said CPU and configured to control memory transactions; and
   a phase lock loop ("CPLL") coupled to said CPU and configured to allow said CPU to operate at more than one power consumption state.

2. The integrated circuit of claim 1, where said CPU is configured to operate at more than one clock frequency for conserving power consumption.

3. The integrated circuit of claim 1, where said PLL provides more than one clock frequency.

4. The integrated circuit of claim 1, further comprising:
   a memory interface coupled to said MCH and configured to communicate with various external memory devices; and
   an input and output ("I/O") interface coupled to said MCH and configured to control I/O traffic.

5. The integrated circuit of claim 1, wherein said integrated circuit is further coupled to an I/O controller and a clock device.

6. The integrated circuit of claim 1, wherein said CPU is capable of operating at more than one voltage level in response to clock signals from said PLL.

7. The integrated circuit of claim 1, wherein said MCH is capable of operating at more than one frequency mode in response to clock signals from said PLL.

8. The integrated circuit of claim 1, wherein said MCH is capable of operating at more than one voltage level in response to clock signals from said PLL.

9. The integrated circuit of claim 1, wherein said GCH is capable of operating at more than one frequency mode in response to clock signals from said PLL.

10. The integrated circuit of claim 1, wherein said GCH is capable of operating at more than one voltage level in response to clock signals from said PLL.

11. The integrated circuit of claim 1, wherein said MCH controls Rambus™ Dynamic Random Access Memory ("RDRAM").

12. A method comprising:
    suspending a phase lock loop ("PLL") that is embedded in an integrated circuit ("IC") from providing a first clock frequency;
    suspending a central processor unit ("CPU") that is embedded in said IC from execution in response to said suspension of PLL;
    suspending a graphic control hub ("GCH") that is embedded in said IC from execution in response to said suspension of PLL;
    resuming said PLL for providing a second clock frequency; and
    resuming said CPU in response to said second clock frequency.

13. The method of claim 12, further comprising:
    suspending a memory control hub ("MCH") that is embedded in said IC from execution in response to said suspension of PLL; and
    resuming said MCH in response to said second clock frequency.

14. The method of claim 12, wherein said suspending PLL further comprises entering a suspension state in response to results of temperature and current calibration.

15. A method comprising:
    suspending a phase lock loop ("PLL") that is embedded in an integrated circuit ("IC") from providing a first voltage level;
    suspending a central processor unit ("CPU") that is embedded in said IC from execution in response to said suspension of PLL;
    resuming said PLL for providing a second voltage level; and
    resuming said CPU in response to said second voltage level.

16. The method of claim 15, further comprising:

suspending a memory control hub ("MCH") that is embedded in said IC from execution in response to said suspension of PLL; and resuming said MCH in response to said second voltage level.

17. The method of claim 15, wherein said suspending PLL further comprises entering a suspension state in response to results of temperature and current calibration.

18. The method of claim 15, further comprising:

suspending a graphic control hub ("GCH") that is embedded in said IC from execution in response to said suspension of PLL; and resuming said GCH in response to said second voltage level.

19. A device comprising:

a central processing unit ("CPU") deposited on an integrated circuit ("IC");

a graphic control hub ("GCH") deposited on said IC and coupled to said CPU for image processing;

a memory control hub ("MCH") deposited on said IC and coupled to said CPU for controlling data transactions; and a phase lock loop ("PLL") deposited on said IC and coupled to said CPU, said PLL configured to switch said CPU to operate at one of several clock frequencies.

20. The device of claim 19, wherein said PLL is further configured to switch said CPU to operate at one of several voltage levels for conserving power consumption.

21. The device of claim 19, wherein said PLL is further configured to switch said GCH to operate at one of several voltage levels for conserving power consumption.

22. The device of claim 19, wherein said PLL is further configured to switch said GCH to operate at one of several clock frequencies for conserving power consumption.

23. The device of claim 19, wherein said PLL is further configured to switch said MCH to operate at one of several voltage levels for conserving power consumption.

24. The device of claim 19, wherein said PLL is further configured to switch said MCH to operate at one of several clock frequencies for conserving power consumption.

* * * * *

UNITED STATES PATENT AND TRADEMARK OFFICE
CERTIFICATE OF CORRECTION

PATENT NO. : 6,442,697 B1
DATED : August 27, 2002
INVENTOR(S) : Jain et al.

It is certified that error appears in the above-identified patent and that said Letters Patent is hereby corrected as shown below:

Title page,
Item [75], delete "Sun-Soo" insert -- Sung-Soo --.

Column 7,
Line 65, delete "CPPL", insert -- PPL --.

Signed and Sealed this

Fifteenth Day of April, 2003

JAMES E. ROGAN
*Director of the United States Patent and Trademark Office*